United States Patent [19]

Payne et al.

[11] 4,227,062

[45] Oct. 7, 1980

[54] OPTIMUM TIME RATIO CONTROL SYSTEM FOR MICROWAVE OVEN INCLUDING FOOD SURFACE BROWNING CAPABILITY

[75] Inventors: Thomas R. Payne; Bohdan Hurko, both of Louisville, Ky.

[73] Assignee: General Electric Company, Louisville, Ky.

[21] Appl. No.: 911,614

[22] Filed: May 31, 1978

[51] Int. Cl.[3] .......................... H05B 6/68; H02J 3/14

[52] U.S. Cl. ...................... 219/10.55 B; 219/10.55 R; 219/486; 219/492; 323/25; 307/41

[58] Field of Search ................. 219/10.55 R, 10.55 B, 219/10.55 E, 484, 485, 486, 492, 493; 323/23, 25; 307/38, 39, 40, 41; 328/70

[56] References Cited

U.S. PATENT DOCUMENTS

| | | | |
|---|---|---|---|
| 3,028,472 | 4/1962 | Baird | 219/10.55 B X |
| 3,081,392 | 3/1963 | Warner | 219/10.55 B |
| 3,128,362 | 4/1964 | Clark et al. | 219/486 X |
| 3,453,415 | 7/1969 | Hermes et al. | 219/486 |
| 3,457,430 | 7/1969 | Samuelson | 307/41 |
| 3,523,170 | 8/1970 | Boehm | 219/10.55 B |
| 3,569,656 | 3/1971 | White et al. | 219/10.55 B |
| 3,717,300 | 2/1973 | Evalds | 219/486 X |
| 3,980,943 | 9/1976 | Cailleux et al. | 323/23 X |
| 4,020,358 | 4/1977 | Wyland | 307/39 |
| 4,024,378 | 5/1977 | McIntosh | 219/486 |

FOREIGN PATENT DOCUMENTS

| | | | |
|---|---|---|---|
| 2315208 | 10/1973 | Fed. Rep. of Germany | 307/40 |

*Primary Examiner*—Bruce A. Reynolds
*Assistant Examiner*—Philip H. Leung
*Attorney, Agent, or Firm*—Bernard J. Lacomis; Radford M. Reams

[57] ABSTRACT

An optimized time ratio control system for a microwave oven including a food surface browning system. The system is particularly useful where the available power is insufficient to operate both the browning system and the microwave energy generating system at the same time, and where the browning system has a relatively high thermal mass. A timing means is effective to establish successive time share cycles. Each time share cycle includes both a long browner ON time interval during which the browning system is energized at its full rated power level and an alternating interval, with the time ratio therebetween under user control. During the alternating intervals, the browning system and the microwave energy generating system are alternately energized, with the time ratio therebetween under the same user control. The overall relative apportionment to microwave cooking power is primarily determined during the alternating intervals with what is essentially duty cycle power level control employing power pulses of relatively short duration. The overall relative apportionment to browner power is primarily determined by the time intervals between the long browner ON time intervals, which between intervals are actually the alternating intervals. During those times during the alternating intervals when the browning system is energized, the browning system is at least kept warm. To compensate for a reduction in this "keep warm" power as the relative apportionment to browner power is decreased during the alternating interval, such as by user control, the long browner ON time intervals are lengthened as the percentage of microwave power increases and the percentage of browning power decreases.

19 Claims, 10 Drawing Figures

100% BROWNING
54.4 SEC.
21.6 SEC.
32.8 SEC.
40.8 SEC.

75% BROWNING
116 SEC.
69.5 SEC.
46.5 SEC.
89 SEC.

50% BROWNING
176 SEC.
128 SEC.
48 SEC.
132 SEC.

25% BROWNING
240 SEC.
180 SEC.
60 SEC.
180 SEC.

10% BROWNING
276 SEC.
207 SEC.
69 SEC.
207 SEC.
50
52
54
56
58
60
62
1

OPTIMUM TIME RATIO CONTROL SYSTEM FOR MICROWAVE OVEN INCLUDING FOOD SURFACE BROWNING CAPABILITY

CROSS REFERENCE TO RELATED APPLICATIONS

This invention is an improvement of the invention which is the subject matter of commonly-assigned copending application Ser. No. 911,615, filed May 31, 1978, by Bohdan Hurko and Thomas R. Payne, entitled "Effective Time Ratio Browning in a Microwave Oven Employing High Thermal Mass Browning Unit." The Hurko and Payne invention in turn is an improvement of the invention which is the subject matter of commonly-assigned copending application Ser. No. 911,555, filed May 31, 1978, by Raymond L. Dills and entitled "Effective Concurrent Microwave Heating and Electrical Resistance Heating in a Countertop Microwave Oven."

BACKGROUND OF THE INVENTION

The present invention relates generally to microwave ovens including supplementary electrical resistance browning elements and, more particularly, to such an oven which is adapted for operation from an approximately 1500 watt electric power source and which employs an electrical resistance browning element having a relatively high thermal mass.

Ovens employing microwave energy to rapidly cook food have come into widespread use in recent years. While microwave cooking generally has the advantage of being faster than conventional cooking it has long been recognized that conventional cooking is superior in certain respects. In particular, for some types of food, microwave cooking is considered unsatisfactory by many people for the reason that there is usually only a slight surface browning effect, especially where a relatively short cooking time is employed.

To realize the benefits of both methods, a number of combination microwave and conventional cooking ovens have been proposed and commercially produced. These ovens, as their name implies, combine in a single cavity the capability of microwave cooking and conventional cooking by electrical resistance heating. The microwave cooking capability is provided by a microwave energy generating device such as a magnetron which produces cooking microwaves when energized from a suitable high voltage DC source. For conventional cooking and browning capability sheathed electrical resistance heating elements, commonly called broil and bake elements, are usually provided at the top and bottom of the cooking cavity respectively.

Several of these combination oven designs have proven to be quite satisfactory in operation and commercially successful. They are typically full-size ovens operated from a 240 volt power source having a current-supplying capability which, for practical purposes, is unlimited. Therefore, simple switching schemes may be employed to selectively energize either the microwave cooking capability, the conventional cooking capability, or both capabilities simultaneously. Many thousands of watts of power are available from the power source, and this is sufficient to heat a domestic sized cooking oven in any manner desired.

More recently, so-called countertop microwave ovens have been introduced. These ovens typically have a somewhat smaller cooking cavity compared to a full-size conventional oven and are designed for operation from a 115 volt, 15 amp household branch circuit. To meet UL requirements, an appliance designed for operation from such a power source is limited to a maximum steady state requirement of 13.5 amperes. This corresponds to approximately 1550 watts. As explained next, this limited power source capability results in some particular problems.

A typical microwave energy generating system intended for a countertop microwave oven requires a major portion of this available power. Such a typical system comprises a magnetron which produces between 400 and 600 watts of output power at a frequency of 2450 MHz, and a suitable power supply for the magnetron. A typical microwave energy generating system has an energy conversion efficiency in the order of 50%. In addition to the microwave energy generating system, a practical microwave oven includes a number of low power load devices such as lamps, motors, and control circuitry. As a typical example, altogether one particular commercially-produced countertop microwave oven model draws approximately 11.2 amps RMS from a 115 volt line for microwave cooking alone. This corresponds to approximately 1300 watts.

For effective and reasonably rapid browning, the watts density over the area of the food covered by a supplementary electrical resistance browning element should be approximately 20 watts per square inch. With 1200 to 1400 watts of available browning power, approximately 60 square inches of food surface area can be covered by radiation from such a browning element. Even 60 square inches is a relatively small area, and any decrease in available browner power would reduce this area even further. As a result, substantially all of the limited available power should be supplied to the browning element.

Therefore, for an oven designed for operation from a 115 volt, 15 amp household branch circuit, as a practical matter the limited power available precludes the simultaneous energization of the microwave energy generating system and the supplementary electrical resistance browning units at their respective full rated power levels, which, particularly in the case of the browning element, is required for effective operation.

In answer to this practical limitation on available power, designers of countertop microwave ovens intended for operation from a power source insufficient to supply both the microwave and electrical resistance browning capabilities simultaneously at their respective full rated power levels have resorted to a "two-step" cooking procedure whereby cooking by microwave energy is accomplished first, with the electrical resistance browning element de-energized. Next the microwave source is de-energized and the electrical resistance browning element is energized for the remainder of the cooking cycle.

As an alternative to a separate electrically energized heating element for browning, a number of special utensils have been proposed and commercially produced to effect browning when used in a microwave oven. These utensils comprise an element, for example a thin resistive film applied to an undersurface of the utensil, which has the capability of absorbing some of the microwave energy available in the cooking cavity and converting the same to heat. The utensil itself becomes sufficiently hot for browning or searing. In a similar vein, devices have been proposed which alter the electromagnetic energy field within the cooking cavity so as to produce near field dielectric heating for improved surface browning. It will be appreciated that while such devices are beneficial with certain foods, the microwave energy they absorb is then unavailable for direct heating of the food. Additionally, they are not as efficient as direct electrical resistance heating because the less-than-100% energy conversion efficiency of the microwave energy generating system must be taken into account.

While not directly related to browning, an important feature included in many microwave ovens is variable microwave power level control. Variable power level control provides flexibility in cooking various types of food, including thawing frozen foods at a reduced power level. One particular power level control scheme which is employed in microwave ovens is duty cycle power level control whereby the microwave energy source is repetitively switched from full OFF to full ON, with the duty cycle under control of the user of the oven. In this way, the time averaged rate of microwave heating can be effectively controlled. The repetition period may vary from in the order of one second for fully electronic duty cycle power level controllers, to in the order of thirty seconds for electromechanical cam operated duty cycle power level controllers.

In accordance with the inventions and disclosures of the above-mentioned copending Dills application Ser. No. 911,555 and the Hurko and Payne application Ser. No. 911,615, effective microwave and electrical resistance heating is accomplished concurrently by a time ratio control system which alternately energizes the microwave energy generating system and the electrical resistance heating system a plurality of times during each cooking operation. As described in more detail in those applications, this in effect time shares the available power and leads to superior cooking results as determined by actual tests.

The Hurko and Payne application Ser. No. 911,615 in particular deals with the specific case where the electrical resistance heating element is an infrared radiant browning element comprising a sheathed electrical resistance heating unit which inherently has a relatively high thermal mass. As pointed out in more detail in that application, effective browning operation requires that the browning unit be allowed to reach at least a minimum temperature. The browning unit temperature is quite important because radiant energy is proportional to the fourth power of browning unit absolute temperature. Thus, radiant browning effectiveness becomes disproportionately more effective as temperature increases. In the Hurko and Payne application, the browning unit remains continuously energized (ON) for at least a minimum time, permitting it to reach an effective temperature. A typical minimum browner ON time is in the order of thirty seconds.

On the other hand, optimum microwave cooking at less than full power requires microwave pulses of relatively short duration, repeating with a cycle period in the order of one or two seconds. If the cycle period is longer, for example up to thirty seconds as is sometimes done, cooking result may be less-than-optimum even though the duty cycle and thus the overall time averaged power level remain the same. The less-than-optimum cooking result occurs because on a short-term basis food temperature may increase beyond what is desirable during the relatively long microwave ON times.

It will thus be apparent that in the time sharing system described in the above-mentioned Dills application Ser. No. 911,555 and the Hurko and Payne application Ser. No. 911,615, compromises are made between the energization waveforms of the microwave energy generating device and of the infrared food browning system.

SUMMARY OF THE INVENTION

Accordingly, it is an object of the invention to provide a cooking oven time sharing system for apportioning available power between a microwave energy generating system and a food surface browning system of relatively high thermal mass which system allows both the microwave energy generating system and the food surface browning system to operate in their optimum manners.

It is a further object of the invention to provide such a system wherein means is provided permitting an operator to vary the cooking parameters over a wide range to effectively apportion the available power between the microwave energy generating system and the food surface browning system.

Briefly stated and in accordance with one aspect of the invention, an optimized time ratio control system for a microwave oven including a food surface browning system includes a timing means effective to establish successive time share cycles. Each time share cycle includes a long browner ON time interval during which the food browning system is energized at its full rated power level. Each time share cycle further includes an alternating interval. The alternating interval in turn includes a plurality of alternating short microwave ON time sub-intervals and short browner ON time sub-intervals during which the microwave energy generating system and the food surface browning system respectively, are energized at their respective full rated power levels. Each long browner ON time interval has at least a predetermined minimum duration selected to enable the browning system to reach at least a minimum effective temperature for browning of the surface of the food by infrared radiant energy. Additionally, during those sub-intervals of the alternating intervals when the microwave energy generating system is not energized, energy is supplied to the food browning system so as to keep the food browning system warm.

Thus, during those intervals when food surface browning is to occur, the food surface browning system is energized for a relatively long period so as to permit the food surface browning system to achieve the relatively high temperature required for efficient browning. Moreover, when less than 100% microwave power is desired, the microwave energy generating system is always energized by relatively short pulses, thereby avoiding excessive short-term microwave heating of the food.

The percentage of microwave power is primarily determined during the alternating interval, and may be viewed as ordinary duty cycle microwave power level control. The percentage of browner power may be viewed as being primarily determined by the duration of the browner OFF times, which correspond to the duration of the alternating intervals, with the duration of the long browner ON time being approximatey fixed. For lower percentages of browner power, the duration of the browner OFF times is increased. This also is duty cycle control, but the cycle period is not constant.

Briefly stated and in accordance with still another aspect of the invention, as the percentage of microwave power is increased during the alternating interval, it is recognized that the available "keep warm" power for the food surface browning system is decreased. To compensate, the long browner ON time interval is lengthened as the percentage of microwave power increases and the percentage of browning power decreases.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawings, in which:

DESCRIPTION OF THE PREFERRED EMBODIMENT

Figure 1:
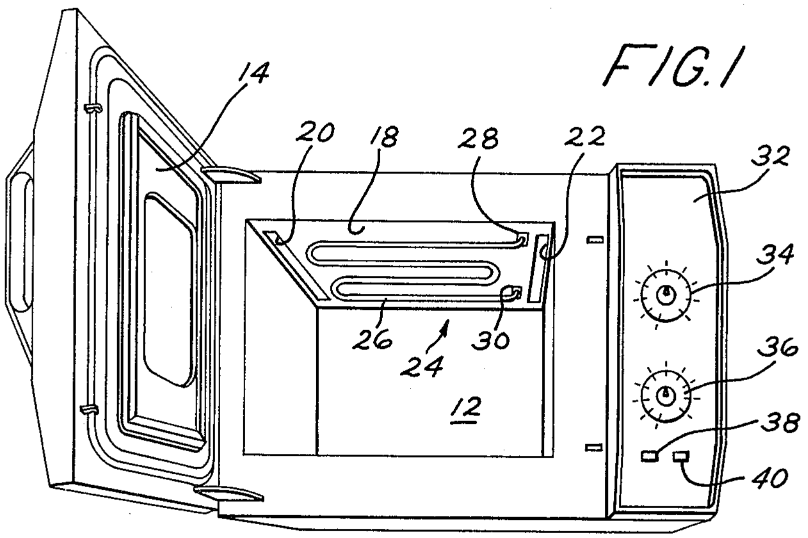
FIG. 1 is a front perspective view of a countertop microwave oven with the access door open to permit viewing of a serpentine sheathed electrical resistance browning unit located at the top of the cooking cavity.

Referring first to FIG. 1, there is shown a countertop microwave oven 10 including a cooking cavity generally designated 12 and an access door 14 for closing the cooking cavity 12.

For supplying microwave energy to the cavity 12, the top wall 18 thereof includes a pair of apertures 20 and 22 which couple microwave energy from a waveguide system (not shown) supplied by a magnetron (not shown) into the cavity 12. It will be appreciated that the microwave feed system illustrated is exemplary only and forms no part of the present invention. For example, instead of the pair of apertures 20 and 22, a single, larger, centrally located aperture covered by a suitable heat resistant plate (not shown), transparent to microwave energy, might be employed.

For food surface browning, an electrical resistance food browning system, generally designated 24, is positioned within the cavity 12 so as to brown by radiant heat energy the surface of food being cooked therein. More specifically, the food surface browning system 24 illustrated comprises a sheathed electrical resistance heating unit 26 of serpentine configuration positioned generally adjacent to but spaced from the top wall 18 of the cooking cavity 12. The ends 28 and 30 of the browning unit 26 are suitably terminated at the top wall 18, the electrical leads (not shown) therefrom being connected to circuitry (FIG. 5) which is located within an electrical components compartment located generally to the right of the cooking cavity 12.

The browning unit 26 is of the sheathed electrical resistance heating unit type and comprises a spiraled electrical resistance wire encased in an elongated ceramic filled metal outer sheath, the outer sheath portion being visible in FIG. 1. As a compromise between heat up rate and manufacturability, the diameter of the heating unit 26 is within a range of from about 0.22 to 0.27 inches. A typical overall length for the serpentine sheathed electrical resistance heating unit 26 is forty to forty-eight inches. The resultant thermal mass is within the approximate range of 0.05 to 0.09 BTU/° F. For an approximately 1200 to 1400 watt heating unit, the heat up rate is in the order of 13° F./second to 26° F./second.

While the browning system 24 illustrated comprises a single sheathed electrical resistance heating unit 26, it will be appreciated that the browning system 26 could as well comprise a plurality of sheathed electrical resistance heating units connected electrically in series or in parallel as required to achieve the proper total power of approximately 1200 to 1400 watts.

A control panel 32 generally to the right of the cooking cavity 12 and forming the front of the aforementioned components compartment includes an upper control knob 34 to enable a user of the oven to select the total duration of a cooking operation. The duration of a cooking operation may be selected by the control knob 34 to range from as little as a minute or less, up to an hour or more, depending upon the particular food being cooked. Alternatively, the duration of a cooking operation need not be precisely determined as a function of time, but instead may be selected to end when the interior temperature of the food being cooked has reached a predetermined temperature representing a desired degree of doneness. This may be accomplished for example by employing a temperature sensing probe and circuit such as is disclosed in U.S. Pat. Nos. 3,975,720-Chen and Fitzmayer, 3,991,615-Hornung, and 4,035,787-Hornung, the entire disclosures of which are hereby incorporated by reference.

The control panel 32 also includes several controls which may be employed by a user to apportion the available power between the microwave energy generating system and the food surface browning system. Specifically, there is an apportionment control 36 which functions to control the time ratio between the energization of the microwave energy source and the energization of the browning unit 26. Additionally, there are a pair of pushbutton switches 38 and 40 which operate in conjunction with the apportionment control 36 to select either microwave only or browner only operation, if desired, at any given percentage of power.

Figure 2:
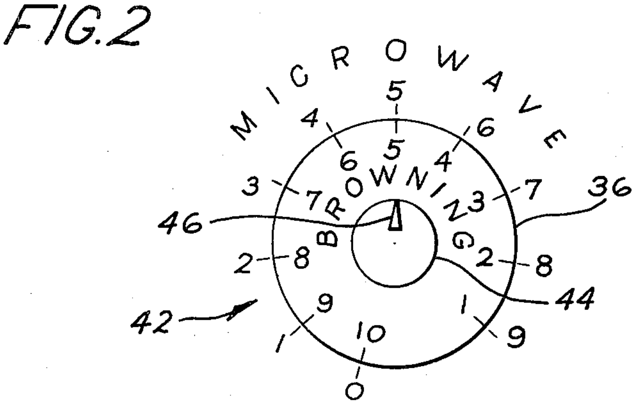
FIG. 2 is an enlarged view of the user operable apportionment control on the control panel of the FIG. 1 oven.

Referring now to FIG. 2, an enlargement of the apportionment control 36 is illustrated. The control 36 comprises outer indicia designated 42, and an inner rotatable knob 44 including a pointer 46. The indicia 42 are divided into an outer set numbered from "0" to "9" which designate the relative percentage apportionment to microwave power, and an inner set numbered from "10" to "1" which designate the percentage of browning power. Comparing the inner and outer rings, it will be seen that the sum of the microwave power and the browning power is always "10". It will be apparent that the indicated numbers may be readily converted to percentages by simply appending a zero. For example, when the pointer 46 is pointing at the "4" on the outer microwave scale and the "6" on the inner browning scale, then the microwave power level is approximately 40% of maximum and the browning power level is approximately 60% of maximum.

Figure 3:
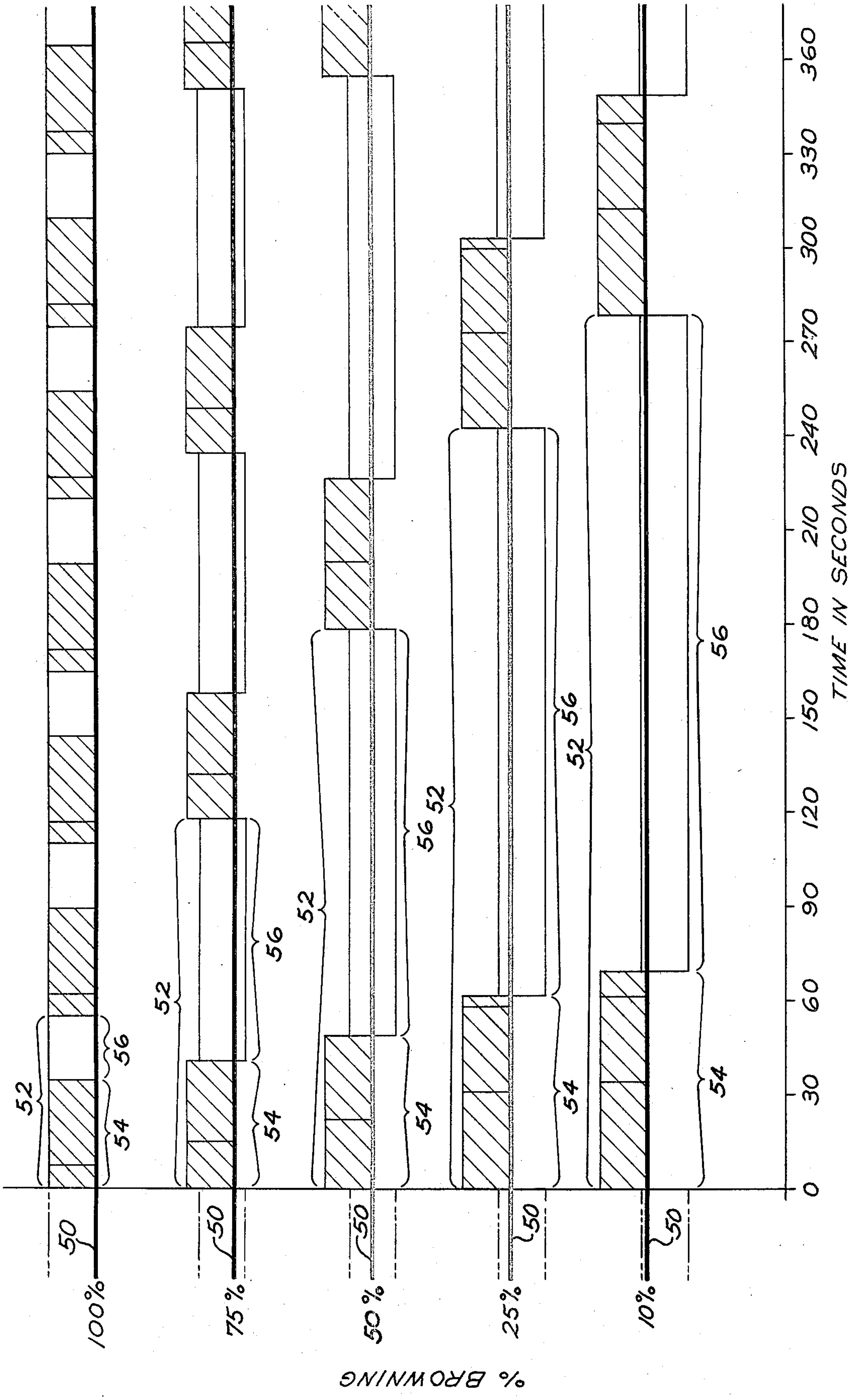
FIG. 3 depicts the energization waveforms of the food surface browning system and the microwave energy generating system as functions of time for five exemplary percentages of browning as selected by the user.

Referring now to FIG. 3, there is shown a graph depicting the energization waveforms of the food browning system 24 and the microwave energy generating system as a function of time for various percentages of browning. The precise times represented by the graphs of FIG. 3 are exemplary only according to one particular embodiment of the invention and are intended only to illustrate the general concepts of the invention.

The horizontal "time in seconds" axis at the bottom of the FIG. 3 is common to each of the five individual graphs in the main part of the figure. The zero second point at which the graphs begin may be selected arbitrarily and does not necessarily represent the beginning of a cooking operation.

Each of the five heavy horizontal axis lines 50 has a label representing the percentage of browning power. The corresponding percentage of microwave power in each case is the complement of the percentage of browning power. That is, for fifty percent browning, the microwave power is also fifty percent. For seventy-five percent browning, the microwave power is twenty-five percent. For twenty-five percent browning the microwave power is seventy-five percent. The shaded bars appearing above the horizontal axes 50 generally represent intervals during which the food browning system 24 is energized, and the shaded bars below the horizontal axes 50 generally represent times during which the microwave energy generating system is energized. However, due to the extreme difference in the durations of the energization of the food browning system 24 and the microwave generating system, and due to the linear time scale employed, it is not possible in FIG. 3 to show complete details for both energization patterns. Accordingly, unshaded bars appearing both above and below the horizontal axes 50 are employed to represent time averaged energization levels of the food browning system 24 and the microwave energy generating system respectively, with individual energization pulses not shown in detail. FIGS. **4*a* through 4*e*, described below, show the details omitted from FIG. 3**.

Now considering the graphs of FIG. 3 in detail, for each browning percentage it can be seen that a repetitive pattern of alternate energizations is established. Specifically, for each case, successive basic time share cycles 52 are established. Each basic time share cycle 52 is further divided into a long browner ON time interval 54 and an alternating interval 56.

Referring now in addition to FIG. 3 to FIGS. **4*a*, 4*b*, 4*c*, 4*d* and 4*e*, further details of each of the browning percentage lines of FIG. 3 are illustrated. For the present, only the right halves of FIGS. 4*a* through 4*e* will be described, and in each case portions of only one basic time share cycle 52 are expanded for greater detail, with other portions omitted, as indicated by broken lines. From FIG. 4*a*, for 100% browning it can be seen that the length of one basic time share cycle 52 is 54.4 seconds. Similarly, from FIG. 4*b*, for 75% browning (and 25% microwave) the length of a basic time share cycle 52 is 116 seconds. The long browner ON time interval 54** in each case is similarly denoted with a large portion omitted as indicated by the broken lines.

The expanded portions in particular of FIGS. **4*a* through 4*e* illustrate details of the energization waveforms during the alternating intervals 56. Specifically, it will be seen that the alternating intervals 56 are subdivided into alternating short microwave ON time sub-intervals 58 and short browner ON time sub-intervals 60. The cross hatched bars above the horizontal axes 50 represent the short browner ON time sub-intervals 60 during which the food browning system is fully energized, and the cross hatched bars below the horizontal axes 50 represent the short microwave ON time sub-intervals 58** during which the microwave energy generating system is fully energized.

It is during the alternating intervals 56 that microwave cooking takes place. It will be seen from the graphs that the sub-intervals 58 and 60 alternate with a period of one second. Thus, relatively short (up to one second) bursts of microwave power are employed, which, as previously mentioned, is preferable where less than 100% microwave cooking power is desired.

Figures 4A, 4B, 4C, 4D, 4E:
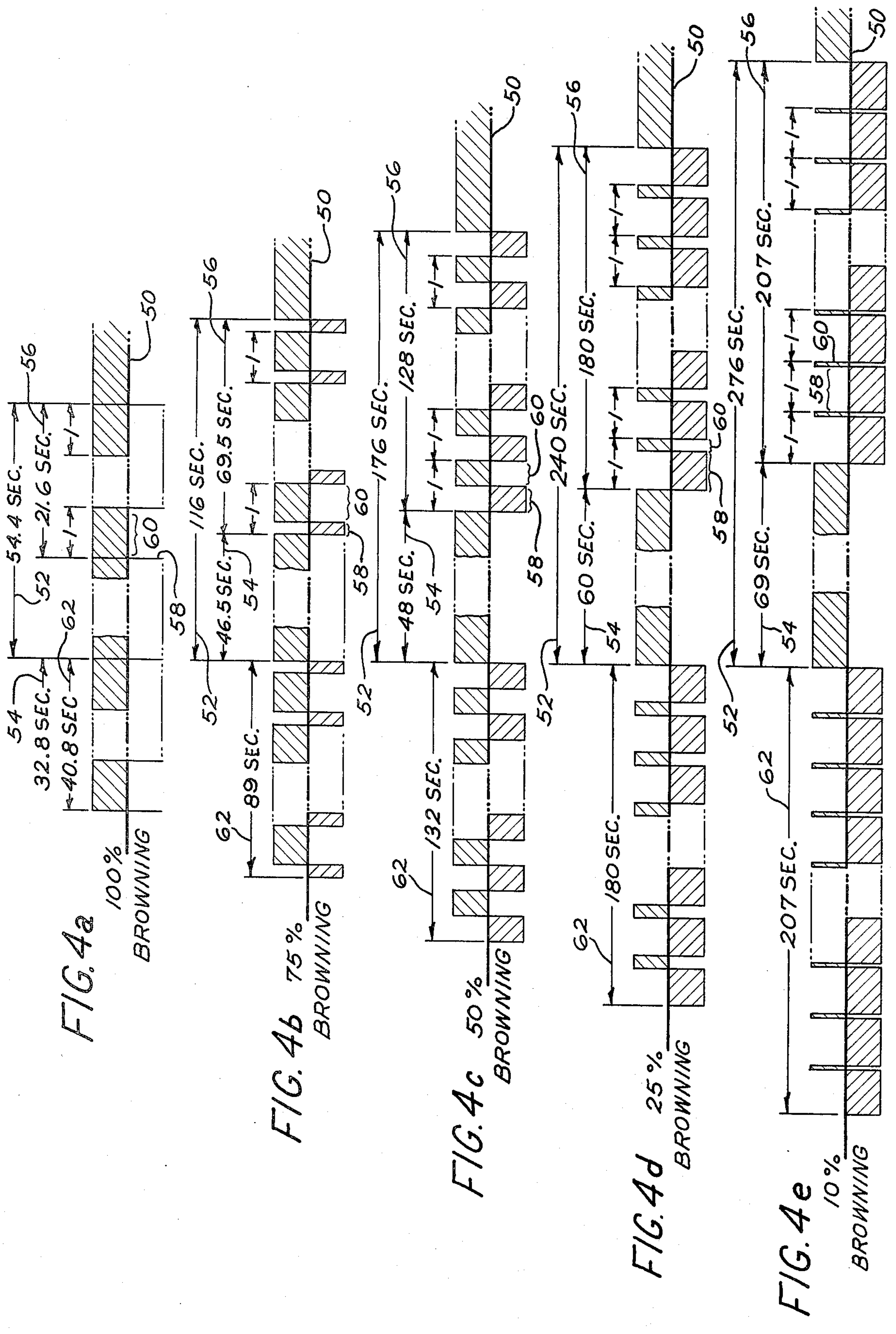
FIGS. 4*a*, 4*b*, 4*c*, 4*d* and 4*e* are respective expansions of the five graphs of FIG. 3 to show additional details thereof, and to further show operation during a preliminary preheating mode which occurs at the beginning of each cooking operation.

Considering briefly the FIGS. **4*a*, 4*b*, 4*c*, 4*d* and 4*e* individually, it can be seen that the patterns remain generally the same, but the time ratio between the short microwave ON time sub-intervals 58 and the short browner ON time sub-intervals 60 during the alternating intervals 56 varies according to the desired power apportionment. For example, in FIG. 4*d* for 75% browning and 25% microwave, the short microwave ON time sub-intervals 58 are shortened to approximately one-fourth of the second repetition period, and the short browner ON time sub-intervals are lengthened to approximately three-fourths of the one second period. In FIG. 4*a* for 100% browning, the short browner ON time sub-intervals 60 represent essentially all of the one second, and therefore the food browning system 24 is essentially continuously energized. The short microwave ON time sub-intervals 58** are represented by momentary spikes which for practical purposes are ineffective to accomplish any cooking.

The overall operation will now be explained with reference to FIG. 3 and FIGS. **4*a* through 4*e* together. The percentage of microwave power is primarily determined during the alternating intervals 56 by means of standard duty cycle power level control using pulses of relatively short duration. The percentage of browner power is primarily determined by leaving the durations of the long browner ON time intervals 54 approximately constant, at least to a first approximation, and varying the duration of the browner OFF time. (The browner OFF time corresponds to the duration of the alternating intervals 56.) It will be appreciated that, due to the interrelationship between energization of the food browning system 24** and the microwave generating system, the above statements are not absolutely correct, but are generalizations intended to lead to an understanding of the nature of the invention.

In addition, during the short browner ON time sub-intervals 60 occurring during the alternating interval 56, power is supplied to the food browning system 24. Especially at lower browning percentages, this power is not sufficient to raise the browning system 24 to a high enough temperature for effective browning, but nonetheless serves to keep the browning system 24 warm so that upon the next occurrence of a long browner ON time interval 54 the food browning system 24 will reach its operating temperature more rapidly than it would otherwise.

From the graphs it will be seen that as the percentage of microwave power is increased, and the percentage of browning power decreased, the alternating intervals 56 lengthen to give a lower percentage of browner power, since the percentage of browner power is primarily determined by varying the duration of browner OFF time. However, the short browner ON time sub-intervals 60 also become quite short. As a result, the "keep warm" effect is largely lost, and at the beginning of the long browner ON time intervals 54 the food browning system 24 is relatively cool. As a further refinement to compensate for this effect, in accordance with the invention the long browner ON time intervals 54 are extended as the percentage of browner power is decreased.

By way of example, specific times are given in the graphs of FIGS. 4*a* through 4*e*, and these will be briefly mentioned. The basic time share cycles 52 range from a minimum of 54.4 seconds for 100% browning (0% microwave) up to 276 seconds for 10% browning (90% microwave). Similarly, the long browner ON time intervals 54 range from a minimum of 32.8 seconds for 100% browning (0% microwave) up to a maximum of 69 seconds for 10% browning (90% microwave). And lastly, the alternating intervals 56 range from a minimum of 21.6 seconds for 100% browning (0% microwave) up to a maximum of 207 seconds for 10% browning (90% microwave). It will be appreciated that these specific times are employed merely to illustrate the principles of and preferred mode of practicing the invention, and are not intended to limit the scope of the invention as claimed.

Considering now the left halves of FIGS. 4*a* through 4*e*, a preliminary warming interval 62 occurs as a first step in a cooking operation. The preliminary warming intervals 62 follow the same pattern as the alternating intervals 56, except they may vary somewhat in duration. The functions of the preliminary warming intervals 62 are two-fold. First, by ensuring that some microwave cooking occurs first, they prevent an outer crust from forming on the food before microwave cooking even begins. This has been found preferable from a cooking standpoint. Additionally, the preliminary warming intervals 62 permit the food browning system 24 to begin warming up before the first long browner ON time interval 54. As a result, more effective browning occurs during the very first long browner ON time interval 54 of a cooking operation.

An example of specific circuitry suitable for generating the waveforms of FIG. 3 and FIGS. 4*a* through 4*e* will now be described with particular reference to FIGS. 5 and 6. It should be appreciated that the circuitry illustrated and described herein is exemplary only and that many different circuits may be devised. Similarly, it will be apparent that a microprocessor based control system may readily be devised to also generate the waveforms of FIG. 3 and FIGS. 4*a* through 4*e*, and it is intended that the claimed invention encompass such a system.

Figure 5:
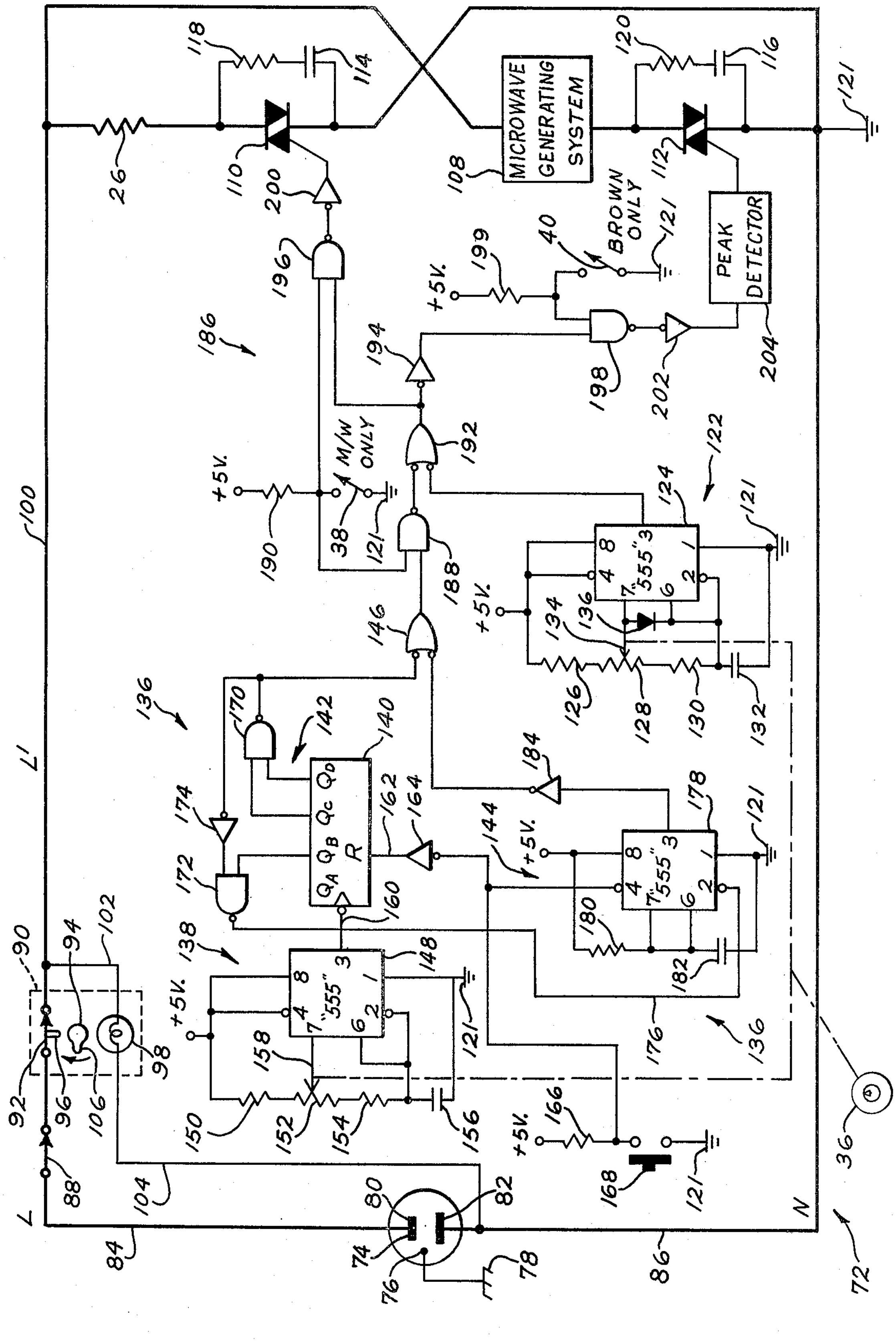
FIG. 5 is an exemplary circuit of a microwave oven including a means for generating the energization waveforms depicted in FIG. 3 and FIGS. 4*a* through 4*e*.

In FIG. 5 an exemplary circuit 72 includes a power portion denoted by relatively heavier lines, and a control portion denoted by relatively lighter lines. Considering first the power portion, a standard 115 volt, 15 amp plug 74 is provided for mating with a conventional household branch circuit receptacle. The plug 74 has a ground pin 76 connected to a cabinet ground 78 for safety, and additionally has L and N prongs 80 and 82. The L and N prongs 80 and 82 supply L and N power conductors 84 and 86 respectively.

Interposed in series with the L conductor 84 is a switch 88 which is representative of several switches and relay contacts conventionally employed in microwave ovens. For example, there is typically a main power switch or relay and various safety interlock switches which serve, for example, to prevent operation unless the door 14 (FIG. 1) is closed.

In order to establish the total overall time duration of a cooking operation, a cooking timer 90 is provided, as indicated by a highly schematic representation thereof. The representative timer 90 comprises a cam-operated switch 92 operated by a rotating cam 94 through a link 96. A timing motor 98 drives the rotating cam 94. The switch 92 is connected in series with the switch 88 so as to energize an L' line 100 when closed as illustrated. The leads 102 and 104 are connected to the L' line 100 and the N line 86 so as to energize the motor 98 when the cam-operated switch 92 is closed. By means of a suitable connection (not shown) to the upper control knob 34 (FIG. 1) the duration established by the timer 90 is user variable according to the type of food being cooked, and can range from less than a minute to a hour or more.

While the highly schematic timer 90 is illustrated, it will be appreciated that many types of cooking timers are possible, including fully electric timers. Moreover, as mentioned above, the total overall time duration of a cooking operation need not actually be specified by the user of the oven as a function of time, but might instead be established by a food temperature sensing probe and suitable circuitry to sense when the interior temperature of the food being cooked has reached a desired degree of doneness.

In the operation of the timer 90, the user control 34 positions the cam 94 to a desired starting position, the exact starting position depending upon the length of cooking time desired. The cam 94 then rotates clockwise until eventually the protrusion 106 contacts the link 96 to open the switch 92. At this point, power to the L' line 100 is interrupted, terminating the cooking operation.

To complete the power circuitry, the browning element 26 and a microwave energy generating system 108 are each connected between the L' conductor 100 and the N conductor 86 through individual controlled switching elements in the form of triacs 110 and 112. When the corresponding triac 110 or 112 is gated, either the browning element 26 or the microwave generating system 108 is energized. For each of the triacs 110 and 112, a protective network comprising a series capacitor 114 or 116 and a resistor 118 or 120 is connected across the main triac terminals.

The microwave energy generating system 108 is preferably a conventional one comprising a permanent magnet magnetron supplied by a half wave doubler power supply including a ferroresonant transformer as the power supply input element.

The remainder of the circuit 72, which supplies suitable gating signals to the triacs 110 and 112 to alternately energize the heating element 26 and the microwave generating system 108, will now be described. The control circuit 72 will be understood to include a conventional power supply (not shown) which supplies +5 volts DC to various indicated supply terminals in the circuit 72. The +5 volts DC is referenced to a circuit reference point 121.

A relatively higher frequency time ratio control oscillator, generally designated 122, generates an output which alternates between a MICROWAVE ON state and a BROWNER ON state. The particular time ratio control oscillator 122 illustrated is a fixed period, variable duty cycle square wave oscillator comprising an astable multivibrator built around a "555" monolithic timer IC 124. The pin numbers shown for the timer IC 124 are those for an 8 pin, dual inline package (DIP).

The connections to the timer IC 124 are conventional, with the positive DC supply Pin 8 connected to +5 volts, and the ground Pin 1 connected to the circuit reference point 121. The reset function is not used and Pin 4 is therefore tied to +5 volts. An upper fixed timing resistor 126, a user variable potentiometer 128, a lower fixed resistor 130 and a timing capacitor 132 are serially connected and together determine the period and duty cycle of the time duration control oscillator 122. The upper terminal of the timing resistor 126 is connected to the +5 volt supply, the lower terminal of the capacitor 132 is connected to the circuit reference point 121, and the junction of the lower fixed resistor 130 and the capacitor 132 is connected to sensing pins 2 and 6 of the IC timer 124. Lastly, a movable potentiometer contact 134 is connected to the discharge Pin 7 of the timer IC 124, and a charging current bypass diode 136 is connected between the movable potentiometer contact 134 and the upper terminal of the capacitor 132.

In order to vary the relative time ratios between the energization of the food surface browning unit 26 and the microwave generating system 108, the position of the movable potentiometer contact 134 is controlled by the user apportionment control 36 as indicated by the broken line connection.

The operation of the astable multivibrator comprising the relatively higher frequency time ratio control oscillator 122 is entirely conventional and will not be described in detail herein. If additional explanation is desired, reference may be had to an article "The IC 'Time Machine'," by Walter G. Jung, published in the November 1973 issue of Popular Electronics, pages 54–57; or to various data sheets provided by manufacturers of "555" IC timers.

Suffice it to say that the output Pin 3 alternates between logic high and logic low, with the relative time ratios between the durations of the high state and the low state being determined by the position of the potentiometer contact 134 as determined by the operator setting of the apportionment control 36. With this particular multivibrator configuration, and due particularly to the presence of the charging path diode 136, the period remains relatively constant at approximately one second, and only the duty cycle is variable. Although a fixed period is preferred from the standpoint of a linear response to control input, it will be appreciated that this is not at all essential to the operation of the invention. Similarly, the one second period is not at all critical. The period may be, for example, two seconds, with substantially the same result.

More specifically, the logic high output state at Pin 3 of the IC timer 124 represents a MICROWAVE ON state, and the logic low at the output Pin 3 represents a BROWNER ON state. The relative duration of the logic high MICROWAVE ON state increases as the position of the potentiometer movable contact 134 is moved towards the lower fixed resistor 130, thereby increasing the charging time of the capacitor 132, and decreases as the potentiometer movable contact 134 is moved towards the upper fixed resistor 126. The converse is true with respect to the logic low BROWNER ON state.

The circuit 72 additionally includes a timing generator, generally designated 136. The timing generator 136 comprises a relatively lower frequency oscillator 138, a four-stage binary counter 140 with associated state decoding logic 142, a triggered one shot timer 144, and, as the output element, a low-activated OR gate 146 which combines the decoded output of the four-stage binary counter 140 and the output of the one shot timer 144 to produce the output of the timing generator 136. The output of the timing generator 136 alternates between two states one of which is a BROWNER ON state. More specifically, the BROWNER ON state is represented by a logic high at the output of the low-activated OR gate 146. The other timing generator output state is represented by a logic low at the output of the low-activated OR gate 146.

Considering now specifically the relatively lower frequency oscillator 138, the oscillator 138 is an astable multivibrator built around another "555" monolithic timer IC 148. The oscillator 138 is similar to the relatively higher frequency time ratio control oscillator 122 previously described but differs in two respects: its oscillation period is much longer, and it is primarily the period which is varied for control purposes rather than the duty cycle.

The relatively lower frequency oscillator 138, in addition to the timer IC 148 comprises an upper fixed timing resistor 150, a potentiometer 152, a lower fixed timing resistor 154, and a capacitor 156, all serially connected, with the other terminal of the fixed resistor 150 connected to +5 volts DC, and the lower terminal of the capacitor 156 connected to the circuit reference point 121. For user control, the position of the movable potentiometer contact 158 is determined by the setting of the user apportionment control 36, in ganged connection with the movable contact 134 of the potentiometer 128. The omission of any charging path diode in the relatively lower frequency oscillator 138, such as the previously described charging path diode 136, causes the charging time for the capacitor 156 to remain constant regardless of the setting of the potentiometer 152. The discharge time of the capacitor 156, and thus the time during which the output Pin 3 is low, does vary as a function of the setting of the movable contact 158 of the potentiometer 152.

The particular time constants selected for the relatively lower frequency oscillator 138 result in a cycle period which varies from 3.4 seconds to 18.7 seconds depending upon the setting of the user control 36. The ganged connection of the user apportionment control 36 to the potentiometer 152 and the potentiometer 128 is such that as the ratio of microwave ON time to browner ON time as determined by the relatively higher frequency time ratio control oscillator 122 increases, the period of the relatively lower frequency oscillator 138 lengthens.

Output Pin 3 of the timer IC 148 is connected to the clock input of the four-stage binary counter 140. The binary counting sequence through which the four-stage binary counter 140 proceeds in response to high to low transitions at the clock input 160 is shown in the following Table I. Specifically, the four stages of the counter 140 are designated A through E, and the states of the four counter Q outputs for each of the Count Nos. from 0 to 15 are represented. In Table I, the L's represent logic low states and the H's represent logic high states.

TABLE I

| Count No. | $Q_D$ | $Q_C$ | $Q_B$ | $Q_A$ | | |
|---|---|---|---|---|---|---|
| 0 | L | L | L | L | | |
| 1 | L | L | L | H | | |
| 2 | L | L | H | L | | |
| 3 | L | L | H | H | | |
| 4 | L | H | L | L | | |
| 5 | L | H | L | H | | |
| 6 | L | H | H | L. | | |
| 7 | L | H | H | H | | |
| 8 | H | L | L | L | | |
| 9 | H | L | L | H | | |
| 10 | H | L | H | L | | |
| 11 | H | L | H | H | | |
| 12 | H | H | L | L | | gate 146 activated |
| 13 | H | H | L | H | | gate 146 activated |
| 14 | H | H | H | L | one shot 144 triggered | gate 146 activated |
| 15 | H | H | H | H | one shot 144 triggered | gate 146 activated |

As will become more apparent, the outputs of the binary counter 140 establish the overall length of each basic time share cycle 52 (FIG. 3 and FIGS. 4*a* through 4*e*). Since the counter 140 has sixteen different states, the outputs thereof extend the length of the period established by the relatively lower frequency oscillator 138 by a factor of sixteen. Thus, in the particular embodiment illustrated, the 3.4 to 18.7 second variable period of the oscillator 138 translates to basic time share cycle lengths from 54.4 seconds to 299.2 seconds.

In order to reset the four-bit binary counter 140 to Count No. 0 at the beginning of a cooking operation, a reset input 162 thereof is supplied by an inverter 164 having its input connected through a pull up resistor 166 to the +5 volt DC supply. To provide a momentary low at the input of the inverter 164 and therefore a momentary high at the reset input 162, a momentary pushbutton switch 168 is connected between the input of the inverter 164 and the circuit reference point 121. The momentary pushbutton switch 168, while shown as a separate switch, is actually an element of a push-to-start switch associated with other control circuitry (not shown) of the oven.

Several particular counter states (Count Nos.) are decoded by the decoding logic 142. More specifically, a NAND gate 170 has its inputs connected to the $Q_C$ and $Q_D$ counter outputs, and its output applied to the upper input of the low-activated OR gate 146. As can be seen from Table I, the $Q_C$ and $Q_D$ outputs are both high for count numbers 12, 13, 14 and 15. During these counts, the NAND gate 170 activates the low-activated OR gate 146 to produce a logic high at the output thereof. In addition, to recognize count numbers 14 and 15 when counter outputs $Q_B$, $Q_C$ and $Q_D$ are all high, another NAND gate 172 is provided, with its lower input connected to the $Q_B$ counter output, and its upper input connected back through an inverter 174 to the output of the NAND gate 170. The low-active output of the NAND gate 172 conducted along a line 176 is used to trigger the one shot timer 144.

The one shot timer 144 is also built around a "555" monolithic timer IC 178. More specifically, the one shot timer 144 comprises a monostable multivibrator which produces a logic high output pulse at output Pin 3 in response to a logic low at the trigger input Pin 2. To ensure that the one shot timer 144 is in its idle condition at the beginning of a cooking operation, the Pin 4 reset input is connected to the pushbutton switch 168. A timing resistor 180 and timing capacitor 182 together determine the width or duration of the output pulse. The particular values of the timing resistor and capacitor 180 and 182 employed in the exemplary circuit 72 result in a one shot output pulse which is twenty-six seconds in duration. The one shot timer 144 is another conventional application of the "555" monolithic timer, and will not be further described. Again, reference may be had to the above-mentioned Jung article, "The IC 'Time Machine'," for further details.

The output Pin 3 of the IC 178 is connected through an inverter 184 to the lower input of the low-activated OR gate 146 which comprises the output element of the timing generator 136.

Considering the overall operation of the timing generator 136, as previously mentioned the output of the low-activated OR gate 146 alternates between a logic high state which is defined as a BROWNER ON state, and a logic low state which is the other state. The output of the low-activated OR gate 146 ultimately establishes the timing and duration of the long browner ON time intervals 54, previously described with reference to FIG. 3 and FIGS. 4*a* through 4*e*. In FIG. 3, as indicated by the single vertical lines running through the blocks denoting the long browner ON time intervals 54 in the upper three horizontal graph lines, and the two vertical lines running through the blocks denoting the long browner ON time intervals 54 in the lower two horizontal graph lines, the long browner ON time intervals 54 are actually generated in two or three segments, which segments are combined by the low-activated OR gate 146.

More specifically, in the top three horizontal lines of FIG. 3, representing 100%, 75% and 50% browning, the right hand segment of each of the long browner ON time intervals 54 will be seen to comprise a constant twenty-six seconds. In the lower two graph lines, representing 25% and 10% browning, the same twenty-six second interval is the middle segment. This twenty-six second segment of the long browner ON time intervals 54 is determined by the one shot timer 144 of FIG. 5. Whenever the one shot output Pin 3 is high, the output of the inverter 184 goes low to activate the low-activated OR gate 146.

The remaining segments of the long browner ON time intervals 54 result when the decoding NAND gate 170 is activated during Count Nos. 12, 13, 14 and 15, and its output goes low. This also activates the low-activated OR gate 146.

In FIG. 3, the long browner ON time intervals 54 for 25% and 10% browning include a third, rightmost segment because, due to the longer period of the relatively lower frequency oscillator 138 under these conditions, the output pulse generated by the one shot timer 144 ends before the counter 140 has progressed through Count Nos. 14 and 15. The output of the decoding NAND gate 170 is thus still low and continues to activate the low-activated OR gate 146.

To combine the outputs of the relatively higher frequency time ratio control oscillator 122 and the timing generator 135 to energize either the heating unit 26 of the food browning system 24 or the microwave energy generating system 108, there is provided a logic means, generally designated 186. The specific function of the logic means 186 is to continuously energize the heating unit 26 when the output of the timing generator 136 (taken at the output of the low-activated OR gate 146)

is in the logic high BROWNER ON state and, when the timing generator 136 output is in the logic low other state, to alternately energize the microwave energy generating system 108 and the browning unit 26 in response to the output of the relatively higher frequency time ratio control oscillator 122.

In particular, the logic means 186 has a NAND gate 188 with its lower input connected to the output of the low-activated OR gate 146. To enable the NAND gate 188, its upper input is connected through a pull up resistor 190 to +5 volts. So long as the upper NAND gate 188 input remains high, it functions as a simple inverter with respect to its lower input. The outputs of the NAND gate 188 and of the relatively higher frequency time ratio control oscillator 122 are applied to the inputs of a low-activated OR gate 192, the output of which is a two state signal alternating between a logic low MICROWAVE ON state and a logic high BROWNER ON state.

An output means responsive to the two-state output of the low-activated OR gate 192 includes an inverter 194 and another enabled NAND gate 196 (functioning as an inverter) having their inputs connected to the gate 192 output, and another enabled NAND gate 198 with an input connected to the output of the inverter 194. The NAND gate 196 is enabled through the pull up resistor 190, and the NAND gate 198 through another pull up resistor 199. To complete the output means, an inverter 200 drives the gate of the triac 110 from the NAND gate 196, and an inverter 202 drives the gate of the triac 112 through a peak detector network 204. The function of the peak detector network 204 is to minimize current surges which could result when power is first applied to the inductive load presented by the power transformer primary winding of the microwave generating system 108. To this end, the peak detector network 204 implements a synchronous switching technique whereby gating signals can initially be supplied to the triac 112 only in coincidence with an approximate voltage peak of the incoming AC voltage waveform, which corresponds to an instant of approximately zero current. For completeness, a suitable peak detector network 204 is described hereinafter with particular reference to FIG. 6.

In the overall operation of the logic means 186 including the output means, whenever the output of the low-activated OR gate 146 is high (BROWNER ON state), the output of the NAND gate 188 is low, activating the low-activated OR gate 192. The high output of the gate 192 then activates the NAND gate 196 and the inverter 200 to drive the triac 110 and energize the browner unit 26. At the same time, the inverters 194 and 202 and the NAND gate 198 are not activated, the triac 112 remains ungated, and the microwave generating system 108 remains de-energized. When the output of the low-activated OR gate 146 is low, the output of the NAND gate 188 is high, allowing the low-activated OR gate 192 to respond to the output of the relatively higher frequency time ratio control oscillator 122. When the oscillator 122 output is the logic low BROWNER ON state, the low-activated OR gate 192 is activated to ultimately energize the browner unit 26 and de-energize the microwave energy generating system 108 as described immediately above. When the oscillator 122 output is in the logic high MICROWAVE ON state, the low-activated OR gate 192 is inactive and its output is low. The NAND gate 196 and the inverter 200 are both inactivated to de-energize the browner unit 26; the inverter 194, the NAND gate 198, and the inverter 202 are all active to gate the triac 112 and energize the microwave generating system 108.

The NAND gates 188, 196 and 198 were each described above as being enabled through pull up resistors to function as inverters. For normal time share operation as just described, this holds true. However, for added control flexibility, these NAND gates are connected to the front panel (FIG. 1) pushbutton switches 38 and 40. In FIG. 5, the "microwave only" switch 38 is connected to pull the upper inputs of the NAND gates 188 and 196 low to disenable these two gates. With the output of the NAND gate 188 low, the output of the low-activated OR gate 192 can freely follow the output of the relatively higher frequency time ratio control oscillator 122 regardless of the output state of the timing generator 136. With the output of the NAND gate 196 low, the browning unit 26 cannot be energized. Thus normal duty cycle control of microwave power over the full percentage range results, with no operation of the food surface browning system 24.

Similarly, the "brown only" switch 40 is connected to pull an input of the NAND gate 198 low to disable the microwave generating system 108. Duty cycle control of the food surface browning system 24 results, with no microwave cooking.

Figure 6:
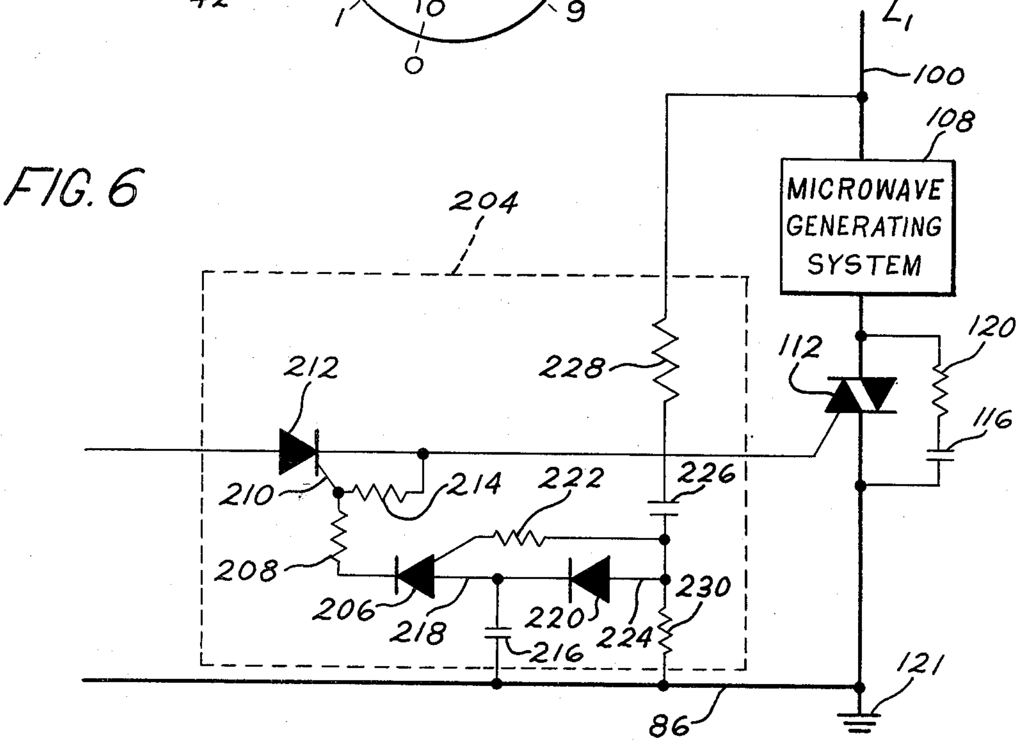
FIG. 6 is an electrical schematic circuit diagram showing one example of circuitry suitable for the box labeled "peak detector" in the circuit of FIG. 5.

Referring lastly to FIG. 6, there is shown an exemplary circuit for the peak detector 204 of FIG. 5. The exemplary peak detector circuit 204 comprises a complementary SCR 206 having its cathode connected through a resistor 208 to the gate 210 of a gate/latch SCR 212. A resistor 214 connected between the gate 210 and the cathode of the gate/latch SCR 212 serves to improve the gate turn-on characteristics and to improve gate noise immunity. A capacitor 216 is connected between the anode 218 of the complementary SCR 206 and the circuit reference point 121. A charging path diode 220 has its cathode connected to the junction of the capacitor 216 and the SCR anode 218, and a resistor 222 parallels the diode 218. The anode 224 of the diode 218 is connected through a phase shift network comprising a series capacitor 226 and a resistor 228 to the L′ conductor 100. To complete the phase shift network, a resistor 230 is connected between the diode anode 224 and the circuit reference point 121.

In the operation of the peak detector network 204, during every cycle of the incoming AC waveform when the voltage of the L′ power source conductor 100 is instantaneously positive with respect to the N conductor 86, the capacitor 216 charges through the resistor 228 the capacitor 226 and the diode 224. Due to the forward voltage drop of the diode 224, the gate of the SCR 206 is supplied with a slightly higher positive potential than the anode 218 through the resistor 222, and the SCR gate-anode junction is reversed biased. Just after the instantaneous line voltage passes its peak value and begins to decrease, the diode 224 becomes reversed biased and ceases conducting. The capacitor 216 remains charged, maintaining voltage on the SCR anode 218. At this same time the gate voltage supplied through the resistor 222 is decreasing. The gate-anode junction of the complementary SCR 206 becomes forward biased, causing the SCR 206 to conduct and discharge the capacitor 216 into the gate 210 of the gate/-latch SCR 212. As a result, the gate/latch SCR 212 can only permit the triac 112 to be triggered into conduction by the output of the inverter 202 (FIG. 5) only in approximate coincidence with a voltage peak of the incoming AC waveform.

The following Table II lists component values which have been found to be suitable in the circuits described herein. It will be appreciated that these component values as well as the circuits themselves are exemplary only and are provided to enable the practice of the invention with a minimum amount of experimentation.

TABLE II

| | |
|---|---|
| Resistors | |
| 26 | 1200 watt sheathed electrical resistance heating unit, 11 ohms |
| 118 | 150 ohm |
| 120 | 150 ohm |
| 126 | 4.7 K ohm |
| 128 | 250 K ohm |
| 130 | 5.6 K ohm |
| 150 | 56 K ohm |
| 152 | 250 K ohm |
| 154 | 15 K ohm |
| 166 | 10 K ohm |
| 180 | 470 K ohm |
| 190, 199 | 10 K ohm |
| 208 | 8.2 K ohm |
| 214 | 1 K ohm |
| 222 | 220 K ohm |
| 228 | 56 K ohm |
| 230 | 5.6 K ohm |
| Capacitors | |
| 114 | 0.1 mfd |
| 116 | 0.1 mfd |
| 132 | 2.3 mfd |
| 156 | 50 mfd |
| 182 | 50 mfd |
| 216 | 0.1 mfd |
| 226 | 0.1 mfd |
| Semiconductor Devices | |
| 110 | G.E. SC160DX4 Triac |
| 112 | G.E. SC160DX4 Triac |
| 124, 148, 178 | Each is a monolithic integrated circuit timer, Signetics NE555, Motorola MC1555, or equivalent |
| 136 | 1N4001 diode |
| 140 | Texas Instruments SN7493 TTL integrated circuit 4-bit binary counter |
| 206 | G.E. C13 complimentary SCR |
| 212 | G.E. C1034 SCR |
| 220 | 1N4001 diode |
| 164, 174, 184 194 | TTL inverters included in Texas Instruments SN7404 hex inverter integrated circuit package |
| 146, 170, 172, 192, 196, 198 | TTL NAND gates included in Texas Instruments SN7400 quadruple 2-input NAND gate integrated circuit packages |
| 200, 202 | Each is 3 parallel inverters in Texas Instruments SN7404 integrated circuit packages, with 120 ohm output pullup resistors (not shows) tied to +5 volts |

From the foregoing it will be apparent that there has been provided a time sharing system for a cooking oven having both a microwave energy generating system and a food surface browning system which allows both the microwave energy generating system and the food surface browning system to operate in optimum manners. The invention is particularly useful where the available power is insufficient to operate both the microwave energy generating system and the food surface browning system at the same time at their respective full rated power levels, and where the food surface browning system has a relatively high thermal mass which limits its heat up rate when supplied with the limited available power.

While a specific embodiment of the present invention has been illustrated and described herein, it is realized that modifications and changes will occur to those skilled in the art. It is therefore to be understood that the appended claims are intended to cover all such modifications and changes as fall within the true spirit and scope of the invention.

What is claimed is:

1. In a cooking oven having a cooking cavity, an electrical resistance food browning system positioned within the cavity so as to brown by radiant energy the surface of food being cooked therein, and a microwave energy generating system supplying the cooking cavity, an optimized time ratio control system comprising:

output means connected to energize either the microwave energy generating system or the electrical resistance food browning system;

timing means controlling said output means and effective to establish successive time share cycles, each time share cycle including a long browner ON time interval during which the food browning system is energized, and each time share cycle further including an alternating interval which in turn includes a plurality of alternating short microwave ON time sub-intervals and short browner ON time sub-intervals during which the microwave generating system and the food browning system, respectively, are alternately energized; and each long browner ON time interval having at least a predetermined minimum duration selected to allow the browning system time to reach at least a minimum effective temperature for browning of the surface of the food by infrared radiant energy;

whereby during the long browner ON time intervals the electrical resistance food browning system is raised to at least an effective temperature, and during the alternating intervals energy is supplied to the food browning system so as to keep the food browning system warm and energy is supplied to the microwave energy generating system in relatively frequent pulses.

2. An optimized time ratio control system according to claim 1, wherein during the long browner ON time interval the food browning system is energized at its full rated power level, and during the short microwave ON time sub-intervals and the short browner ON time sub-intervals the microwave generating system and the food browning system, respectively, are alternately energized at their respective full rated power levels.

3. An optimized time ratio control system according to claim 1, which further comprises operator input means for selecting a desired time averaged apportionment between browner ON time and microwave ON time, said operator input means effective during the alternating intervals to vary the time ratio between the short microwave ON time sub-intervals and the short browner ON time sub-intervals.

4. An optimized time ratio control system according to claim 1, which further comprises operator input means for selecting a desired time averaged apportionment between browner ON time and microwave ON time, said operator input means effective to vary the time ratio between the long browner ON time intervals and the alternating intervals.

5. An optimized time ratio control system according to claim 3, wherein said operator input means is further effective to lengthen the long browner ON time intervals as the relative portion of browner ON time during the alternating intervals decreases.

6. An optimized time ratio control system according to claim 3, wherein said operator input means is further effective to lengthen the long browner OFF time intervals as the relative portion of browner ON time during the alternating intervals decreases.

7. In a cooking oven having a cooking cavity, an electrical resistance food browning system positioned within the cavity so as to brown by radiant energy the surface of food being cooked therein, a microwave energy generating system supplying the cooking cavity, and a means for establishing the overall duration of a cooking operation, the oven adapted for operation from an electric power source insufficient to supply both the food browning system and the microwave energy generating system simultaneously, and the food browning system having a relatively high thermal mass such that its heat up rate is within the approximate range of 13° F./second to 26 ° F./second when drawing substantially all of the power available from the electric power source, an optimized time ratio control system comprising:

output means connected to energize either the microwave energy generating system or the electrical resistance food browning system from the electric power source;

timing means controlling said output means and effective to establish successive time share cycles, each time share cycle including a long browner ON time interval during which the food browning system is energized at its full power level, and each time share cycle further including an alternating interval which in turn includes a plurality of alternating short microwave ON time sub-intervals and short browner ON time sub-intervals during which the microwave generating system and the food browning system, respectively, are alternately energized at their respective full rated power levels; and each long browner ON time interval having at least a predetermined minimum duration selected to allow said browning system time to reach at least a minimum effective temperature for browning of the surface of the food by infrared radiant energy;

whereby during the long browner ON time intervals the electrical resistance food browning system is raised to at least an effective temperature for food surface browning, and during the alternating intervals energy is supplied to the food browning system so as to keep the food browning system warm and energy is supplied to the microwave energy generating system in relatively frequent pulses.

8. An optimized time ratio control system according to claim 7, wherein the duration of each long browner ON time interval is within the approximate range of thirty seconds to eighty seconds, the duration of each alternating interval is within the approximate range of twenty seconds to two hundred and thirty seconds, and the short microwave ON time sub-intervals and one short browner ON time sub-intervals alternate with a period in the order of one second.

9. An optimized time ratio control system according to claim 7, which further comprises operator input means for selecting a desired time averaged apportionment between browner ON time and microwave ON time, said operator input means effective during the alternating intervals to vary the time ratio between the short microwave ON time sub-intervals and the short browner ON time sub-intervals.

10. An optimized time ratio control system according to claim 7, which further comprises operator input means for selecting a desired time averaged apportionment between browner ON time and microwave ON time, said operator input means effective to vary the time ratio between the long browner ON time intervals and the alternating intervals.

11. An optimized time ratio control system according to claim 9, wherein said operator input means is further effective to lengthen the long browner ON time intervals as the relative portion of browner ON time during the alternating intervals decreases.

12. An optimized time ratio control system according to claim 11, wherein said operator input means is further effective to lengthen the long browner OFF time intervals as the relative portion of browner ON time during the alternating intervals decreases.

13. An optimized time ratio control system according to claim 7, which further comprises means for ensuring that each cooking operation commences with an alternating interval whereby microwave cooking at the desired average power level begins immediately and preliminary warming of the food browning systems occurs prior to the first long browner ON time interval.

14. In a cooking oven having a cooking cavity, an electrical resistance food browning system positioned within the cavity so as to brown by radiant energy the surface of food being cooked therein, a microwave energy generating system supplying the cooking cavity, and a means for establishing the overall duration of a cooking operation, the oven adapted for operation from an electric power source insufficient to supply both the food browning system and the microwave energy generating system simultaneously, an optimized time ratio control system comprising:

a user variable timing means which produces a two-state output signal alternating between a MICROWAVE ON state and a BROWNER ON state;

output means responsive to the two-state output signal from said timing means and operatively connected to energize either the microwave energy generating system or the electrical resistance food browning system from the electric power source;

said timing means effective to establish an alternating interval during which the two-state output signal alternates between the two states with a period in the order of one to two seconds, and during which alternating interval variable duty cycle control of the time averaged microwave power level is accomplished;

said timing means further effective to establish a long browner ON time interval during which the two-state output signal remains in the BROWNER ON state; the long browner ON time interval having at least a minimum duration to enable the browning system to reach a temperature effective for browning of the surface of the food by infrared radiant energy;

alternating intervals and long browner ON time intervals occurring in alternate succession, with the time-averaged browner power level primarily determined by the duration of the alternating intervals;

heating of the food browning system occurring during those periods of the alternating interval when the microwave generating system is not energized; and the duration of the long browner ON time intervals being extended as the relative portion of microwave power during the alternating interval increases.

15. An optimized time ratio control system according to claim 14, wherein said timing means is effective to establish an alternating interval at the beginning of each cooking operation.

16. In a cooking oven having a cooking cavity, an electrical resistance food browning system positioned within the cavity so as to brown by radiant energy the surface of food being cooked therein, a microwave energy generating system supplying the cooking cavity, a control circuit comprising:

a relatively higher frequency time ratio control oscillator for generating an output which alternates between a MICROWAVE ON state and a BROWNER ON state;

a timing generator including a relatively lower frequency oscillator, said timing generator generating an output which alternates between two states, one of which is a BROWNER ON state;

logic means for combining the outputs of said relatively higher frequency time ratio control oscillator and of said timing generator to energize either said food browning system or said microwave energy generating system at their respective full rated power levels in response to said outputs, said logic means serving, when the output of said timing generator is in the BROWNER ON state to energize said browning system, and when the output of said timing generator is in the other state to alternately energize said microwave energy generating system and said food browning system in response to the output of said relatively higher frequency control oscillator.

17. The control circuit according to claim 16, which further includes user input means for varying the relative time ratio of the signals generated by the relatively higher frequency time ratio control oscillator.

18. The control circuit according to claim 17, wherein said user input means additionally varies the duration of time which the output of said timing generator remains in the other state, the relationship between the control effects being such that as the portion of time which the output of the relatively higher frequency time ratio control oscillator is in the MICROWAVE ON state increases, the duration of time during which the output of said timing generator remains in the other state increases.

19. The control circuit according to claim 18, wherein as the duration of time which the output of said timing generator remains in the other state increases, the time which said timing generator output remains in the BROWNER ON state also increases.

* * * * *